US009049050B2

(12) United States Patent
Birlik

(10) Patent No.: US 9,049,050 B2
(45) Date of Patent: Jun. 2, 2015

(54) SYSTEM AND METHOD FOR EQUALIZING TRANSMISSION DELAY IN A NETWORK

(71) Applicant: Firat Birlik, Istanbul (TR)

(72) Inventor: Firat Birlik, Istanbul (TR)

(73) Assignee: AIRTIES KABLOSUZ ILETISIM SANAYI VE DIS TICARET AN GULBAHAR MAHALLESI AVNI DILLIGIL SOKAK, Istanbul (TR)

( * ) Notice: Subject to any disclaimer, the term of this patent is extended or adjusted under 35 U.S.C. 154(b) by 170 days.

(21) Appl. No.: 13/622,891

(22) Filed: Sep. 19, 2012

(65) Prior Publication Data
US 2013/0242862 A1    Sep. 19, 2013

Related U.S. Application Data

(60) Provisional application No. 61/624,834, filed on Apr. 16, 2012, provisional application No. 61/612,747, filed on Mar. 19, 2012.

(51) Int. Cl.
*H04L 12/26* (2006.01)
*H04L 12/54* (2013.01)
*H04L 12/801* (2013.01)
*H04L 12/861* (2013.01)

(52) U.S. Cl.
CPC ............ *H04L 12/5693* (2013.01); *H04L 47/34* (2013.01); *H04L 49/9057* (2013.01)

(58) Field of Classification Search
None
See application file for complete search history.

(56) References Cited

U.S. PATENT DOCUMENTS

| 5,805,602 | A | 9/1998 | Cloutier et al. |
| 6,483,841 | B1 * | 11/2002 | Chang et al. ................. 370/412 |
| 7,499,446 | B1 | 3/2009 | Gou et al. |
| 7,693,130 | B2 | 4/2010 | Barry et al. |
| 7,787,436 | B2 | 8/2010 | Kish et al. |
| 7,920,475 | B2 | 4/2011 | Lee |
| 7,936,695 | B2 | 5/2011 | Oran |
| 7,986,624 | B2 * | 7/2011 | Thesling ................... 370/230.1 |

(Continued)

FOREIGN PATENT DOCUMENTS

EP    2383935 A2    11/2011

OTHER PUBLICATIONS

Air 5440 300Mbps Wireless ADSL2+4 Port Router data sheet (Web address: http://www.airties.com/product-details.asp?pn=Air 5440 &i=2&ci=104&cat1=Wireless+Products+&cat2=Wireless+ DSL+Modern%2FGateways&dil=eng) (prior to application filing date of Sep. 19, 2012).

(Continued)

*Primary Examiner* — Alex Skripnikov
(74) *Attorney, Agent, or Firm* — Harness, Dickey & Pierce, PLC

(57) ABSTRACT

A network device includes an antenna connected to an RF chip and a processor coupled to an Ethernet port, the RF chip, a program memory, a packet buffer memory, a pointer buffer memory, and a program memory. The program memory contains instruction that, when executed by the processor, cause a plurality of packets received by the antenna and the RF chip in a first order to be stored in the packet buffer memory in such order, cause a pointer associated with each one of the plurality of packets to be stored in the pointer buffer memory, cause the pointers stored in the pointer buffer memory to be placed in a second order in accordance with a timestamp that is included with each packet, cause the packets stored in the packet buffer memory to be passed along to the Ethernet port in accordance with the sorted pointer to each packet.

14 Claims, 11 Drawing Sheets

(56) References Cited

U.S. PATENT DOCUMENTS

| | | |
|---|---|---|
| 8,023,419 B2 | 9/2011 | Oran |
| 2002/0031125 A1 | 3/2002 | Sato |
| 2003/0133465 A1 | 7/2003 | Alfano |
| 2006/0187822 A1 | 8/2006 | Peleg |
| 2007/0206600 A1 | 9/2007 | Klimker et al. |
| 2009/0190613 A1* | 7/2009 | Finn .............................. 370/509 |

OTHER PUBLICATIONS

Air 4420 300Mbps 2,4/5Ghz Wireless Video Streaming Media Server data sheet (Web address: http://www.airties.com/product-details.asp?pn=Air%204420&i=2&ci=104&cat1=Wireless+Products+&cat2=AP%2FRouter%2C+Mesh+point%2C+Disk+%26+Print+Server&dil=eng) (prior to application filing date of Sep. 19, 2012).

Foreign Patent Office Papers dated Sep. 23, 2014.

Combined Search and Examination Report under Sections 17 & 18(3) dated Feb. 7, 2013 for corresponding Application No. GB1218033.7.

International Search Report dated Jul. 24, 2013 for PCT/EP2013/055572.

International Preliminary Report on Patentability dated Sep. 23, 2014 for PCT/EP2013/055572.

* cited by examiner

SYSTEM AND METHOD FOR EQUALIZING TRANSMISSION DELAY IN A NETWORK

CROSS REFERENCE TO RELATED APPLICATIONS

The present application claims benefit of U.S. Provisional Patent Application No. 61/612,747, filed Mar. 19, 2012, and U.S. Provisional Patent Application Ser. No, 61/624,834, filed Apr. 16, 2012. The entire contents of both of these applications are incorporated herein by reference.

BACKGROUND OF THE INVENTION

1. Field of the Invention

The present application relates to communications networks and in particular a system and method to equalize transmission delays in such networks.

2. Description of the Background of the Invention

In a communication network such as an Ethernet network or an 802.11 wireless network, data transmitted from a transmitting device to a receiving device are generally divided into small payloads. The transmitting device creates a packet that includes additional information such as the network addresses of the transmitting and receiving devices and control information such as a sequence number and error correction codes in addition to the payload. Thereafter the transmitting device sends the packet over a wired or wireless medium to a receiving device. Upon receiving the packet, the receiving devices extracts the payload from the packet and combines such payload with other previously received payloads in accordance with the sequence number to reconstruct all of the data being sent.

In some communication networks, the receiving device sends an acknowledgement packet having acknowledgement data to the transmitting devices for each received data packet, if the transmitting device does not receive such an acknowledgement packet associated with a particular data packet within a predetermined period of time, the transmitting device may resend the data packet. The receiving device may also send a resend packet to the transmitting device to indicate that a corrupt packet was received and such packet should be resent.

The number of times a particular packet needs to be resent and the elapsed time, or transmission delay, between the first transmission of such packet and successful receipt of the packet by the receiving device, depends on a number of factors. Such factors include collisions with other packets sent by other devices at the same time the particular packet is sent and interference from other devices operating in the vicinity of the network. Because of such transmission delay, the order in which a transmitting device transmits packets may not be identical to the order in which such packets are received by a receiving device.

Some applications require packets to be available at predetermined times so that the data transmitted by such payloads may be processed efficiently. For example, an application that displays streamed video requires data associated with the video to be available when needed for presentation. If such data are not available when needed, the quality of the video may suffer or in some cases the video presentation may stall until sufficient data are received.

Improving the predictability of when transmitted packets will be available to an application operating on a receiving device can avoid unwanted interruptions in streamed data. Such improved predictability may also be useful in applications using non-streamed data.

Lee, U.S. Pat. No. 7,920,475, is directed to systems and method for adaptive removal of delay jitter effect and low end-to-end delay. The abstract of Lee recites "[s]ystems, modules, methods and computer readable mediums for adaptive removal of delay jitter and low end-to-end delay are provided. The method may include the following operations at a delay buffer: calculating a holding time for a plurality of packets input into a network; buffering each of the plurality of packets for the duration of the holding time; and arranging the buffered packets in a sequence indicative of an order in which the buffered packets were input into the network. The holding time may be based on a difference between a current maximum delay of the plurality of packets in a current time window and a delay of a first packet of the plurality of packets in the current time window. The method may also include playing back the buffered packets at a selected playback time. Playing back the buffered packets may be performed at a reception mechanism." The entire contents of U.S. Pat. No. 7,920,475 are incorporated herein by reference.

Oran, U.S. Pat. No. 7,936,695, discloses a router, switch, or a network node that generates reports of packet level statistics and information for a media stream. The abstract of this patent states a "router, switch, or other network node generates reports that contain packet level statistics and other information for a monitored media stream. The media stream reports reduce the amount of bandwidth typically required for sending monitored media stream information back to a central analysis device. However the computation of other media stream analytics, such as long term statistical averaging or quality metric computation, is performed by the central analysis device to remove some of the processing burden from the individual network nodes." The entire contents of U.S. Pat. No. 7,936,695 are also incorporated herein by reference.

Oran, U.S. Pat. No. 8,023,419, is directed to a packet filter that identifies multimedia packets associated with a particular media stream. The abstract of such patent states "a packet filter (or "trap") is installed on one or more interfaces of a router, switch (intermediary) or other node in an IP network that identifies multimedia packets for a particular media stream. A packet replicator (or "cloner") duplicates the identified packets allowing the original packets to continue through the IP network. A forwarder ("tunneler") encapsulates and sends the cloned media packets to a central facility where the tunneled media stream is further analyzed." The entire contents of U.S. Pat. No. 8,023,419 are also incorporated herein by reference.

Gou et al., U.S. Pat. No. 7,499,446, discloses using a Real Time Transmission Protocol (RTP) to embed MPEG packets within RTP packets. The abstract of Gou et al. recites "[t]he present invention addresses the issue of jitter and clock drifting in streaming media applications. The present invention utilizes the Real Time Transaction Protocol (RTP) to embed MPEG packets within RTP packets in a Multiple Program Transport Stream (MPTS). Each MPEG packet in an MPTS stream is tagged at a gateway with: an arrival timestamp, a per-flow index and internal index to identify where the packet resides in an RTP packet and within a stream. After demultiplexing, this information is utilized in conjunction with the sending timestamp of each RTP packet to create a sending time for each MPEG packet to aid in the reduction of jitter and clock drifting." The entire contents of U.S. Pat. No. 7,499,446 are also incorporated herein by reference.

Cloutier et al., U.S. Pat. No. 5,805,602, is directed to a network monitoring system for cell delay variation. The abstract of Cloutier et al. recites "[A]n arrangement (apparatus and method) for monitoring jitter caused during transport of digitally-coded information in a packet switched network, and for managing network operations in accordance with the detected jitter. The detected jitter is used to determine whether corrective action is necessary, such as rerouting network traffic, or performing network maintenance. The disclosed arrangement detects program clock reference (PCR) values from an MPEG-encoded transport stream, whereby each pair of PCR values represents an expected arrival time of a corresponding stream segment. An actual arrival time for the corresponding stream segment is determined in response to detection of the corresponding PCR values and an independent clock signal. The expected arrival time of the stream segment and the actual arrival time are correlated with an accumulation of expected and actual [arrival times] of previously-received data packet stream segments in order to determine the jitter in the digital data stream. The jitter is corrected by a combination of adaptive buffering techniques and restamping the PCR value with corrected values coinciding with the actual arrival time of the stream segments." The entire contents of U.S. Pat. No. 5,805,602 are also incorporated herein by reference.

Barry et al., U.S. Pat. No. 7,693,130, is directed to an apparatus and method for synchronizing distribution of packet information. The abstract of Barry et al. recites "[A]n apparatus and method are described for synchronizing distribution of packet information. In one embodiment, the invention includes timestamp processing logic to process a transmit time indicator embedded within the packet information, where the transmit time indicator is based on a time reference, and service synchronization queuing logic to hold the packet information until a time offset after the transmit time indicator, where the service synchronization queuing logic is synchronized to the time reference." The entire contents of U.S. Pat. No. 7,693,130 are also incorporated herein by reference.

Kish et al., U.S. Pat. No. 7,787,436, is directed to an access point that converts a multicast or broadcast packet into a unicast packet directed to a station associated with the access point. The abstract of Kish et al. recites "[A]n access point of a communications network is configured to receive a multicast or broadcast packet from a source. The access point converts the multicast or broadcast packet into a unicast packet addressed to a station associated with the access point. The access point then transmits the unicast packet over the communications network from the access point to the station. The access point further may determine a minimum data rate by which the access point may transmit the multicast or broadcast packet to the station and determines an effective unicast rate for transmitting the unicast packet to the station. If the effective unicast rate does not exceed the minimum data rate, the access point does not transmit the unicast packet to the station and transmits the multicast or broadcast packet," The entire contents of U.S. Pat. No. 7,787,436 are also incorporated herein by reference.

The entire contents of Birlik, U.S. Provisional Application 61/612,747, filed Mar. 19, 2012, are incorporated herein by reference.

All documents such as user manuals and data sheets found at the following URLs are incorporated in their entirety by reference:

http://www.airties.com/product-details.asp?pn=Air 5440&i=2&ci=104&cat1=Wireless+Products+&cat2=Wireless+DSL+Modem%2FGateways&dil=eng http://www.airties.com/product-details.asp?pn=Air%204420&i=2&ci=104&cat1=Wireless+Products+&cat2=AP%2FRouter%2C+Mesh+point%2C+Disk+%26+Print+Server&dil=eng

SUMMARY OF THE INVENTION

According to one aspect of the invention, a network device comprises an antenna connected to an RP chip. The network device also comprises a processor operatively coupled to an Ethernet port, the RF chip, a program memory, a packet buffer memory, a pointer buffer memory, and a program memory. The program memory contains a first set of instructions that, when executed by the processor, cause a plurality of packets that are received by the antenna and RF chip in a first order to be stored in the packet buffer memory in that first order. The program memory contains a second set of instructions that, when executed by the processor, cause a pointer associated with each one of the plurality of packets to be stored in the pointer buffer memory. The program memory contains a third set of instructions that, when executed by the processor, cause the pointers stored in the pointer buffer memory to be placed in a second order in accordance with a timestamp that is included with each packet that is not recognizable at a player level. The program memory contains a fourth set of instructions that, when executed by the processor, cause the packets stored in the packet buffer memory to be removed therefrom and passed along to the Ethernet port in accordance with the sorted pointer to each packet stored in the pointer buffer memory.

According to a more particular aspect of the invention, the timestamp is at the end of each packet.

According to another more particular aspect of the invention, the timestamp is included in the packet at the time it is received by the network device.

According to a more specific aspect of the invention, the network device comprises a video bridge.

According to another more specific aspect of the invention, the packet includes a destination address and the network device does not modify such destination address.

According to still another more specific aspect of the invention, the fourth set of instructions, when executed, cause the packet from the packet buffer memory to be passed along in response to receipt of a further packet.

According to yet another more specific aspect of the invention, the packets include a payload that is associated with at least one of video or audio data.

According to further more specific aspect of the invention, the network device is associated with a client device and the second set of instructions, when executed, cause only pointers to packets in the packet buffer memory that are associated with the client device to be stored in the pointer buffer memory.

According a yet another more specific aspect of the invention, the client device includes a video player.

According to a still further aspect of the invention, the plurality of packets is received from the Internet.

According yet another aspect of the invention, the network device is operated in a local area network and the first set of instruction, when executed, cause packets to be received from another device operating in such network.

DETAILED DESCRIPTION OF THE PREFERRED EMBODIMENTS

Figure 1:
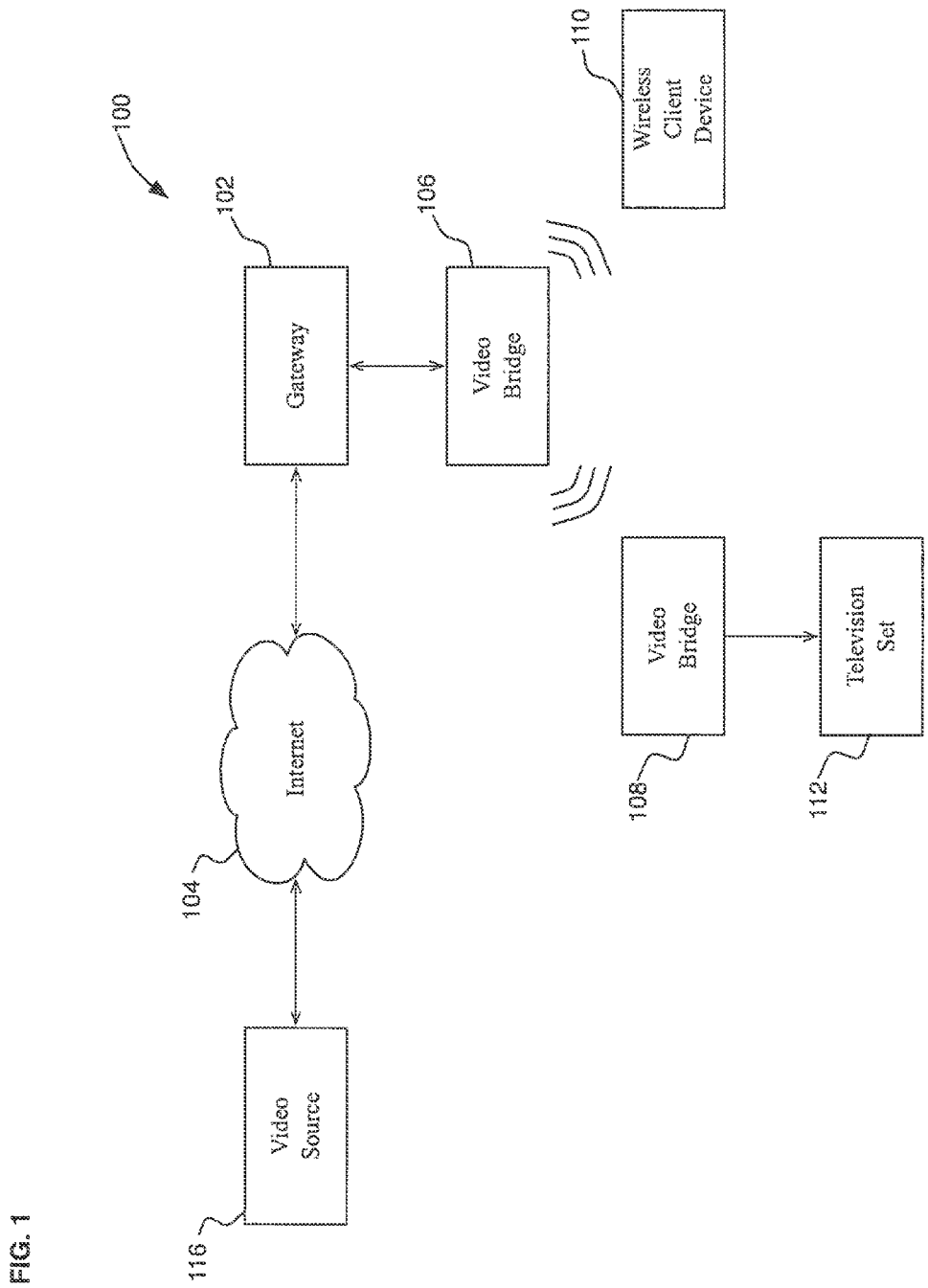
FIG. 1 is a block diagram of a network.

FIG. 1 is a system diagram of a network 100. The network 100 includes a gateway 102 connected to a wide area network 104, for example, the Internet. The network 100 includes video bridges 106 and 108. The video bridge 106 is coupled to the gateway 102 by a wired connection, for example, an Ethernet connection. A wireless client device 110 is associated with the video bridge 106 and a wired television set 112 is associated and coupled via a wired connection to the video bridge 108.

The gateway 102 receives packets transmitted thereto from the Internet 104 and forwards such packets to the video bridge 106. The video bridge 106 transmits to the wireless client 110 any such packets that include a destination address associated with the wireless client 110. The video bridge 106 wirelessly retransmits the packets that do not include such a destination address to one or more other device(s), such as the video bridge 108, operating in the network 100. If the transmission is addressed to the television set 112, the video bridge 108 forwards the transmission received thereby from the video bridge 106 to the television set 112.

Further, it should be apparent that, in some embodiments, the video bridge 106 may communicate with the gateway 104 via a further access point (not shown) and may communicate with such access point using either wireless or wired communications. The video bridge 106 receives transmissions from the video bridge 108 and forwards such transmissions to the gateway 102, which forwards such transmissions to devices operating in the Internet. Similarly, the video bridge 106 receives wireless transmissions from the wireless client device 110 and the television set 112, via the video bridge 108, and forwards such transmission to the gateway 102. The video bridge 106 also allows the television set 112 and the wireless communication device 110 to communicate with one another.

A video source 116 may transmit video data to the wireless client device 110 or the television set 112 in the network 100. Such video data may be streamed video data that is transmitted via the gateway 104 and the video bridge 106 and forwarded to the wireless client device 110 and/or the television set 112 as described above. The video source 116 may transmit video data using a unicast communication protocol to a particular one of the wireless client device 110 or the television set 112. Alternatively, the video source 116 may transmit such data using a multicast communication protocol to one or both of the wireless client device 110 and the television set 112 that have registered with the video source 116 to receive such data. In still other cases, the video source 116 may transmit the data using a broadcast communication protocol to all of the devices operating in the network 100. It should be apparent that the video source 116 may be a device that transmits any type of content data, for example, streamed video or streamed audio. Further, it should be apparent that the video source 116 may be a device operating within the network 100 and transmit data to one or both of the wireless client device 110 and the television set 112.

Figure 2:
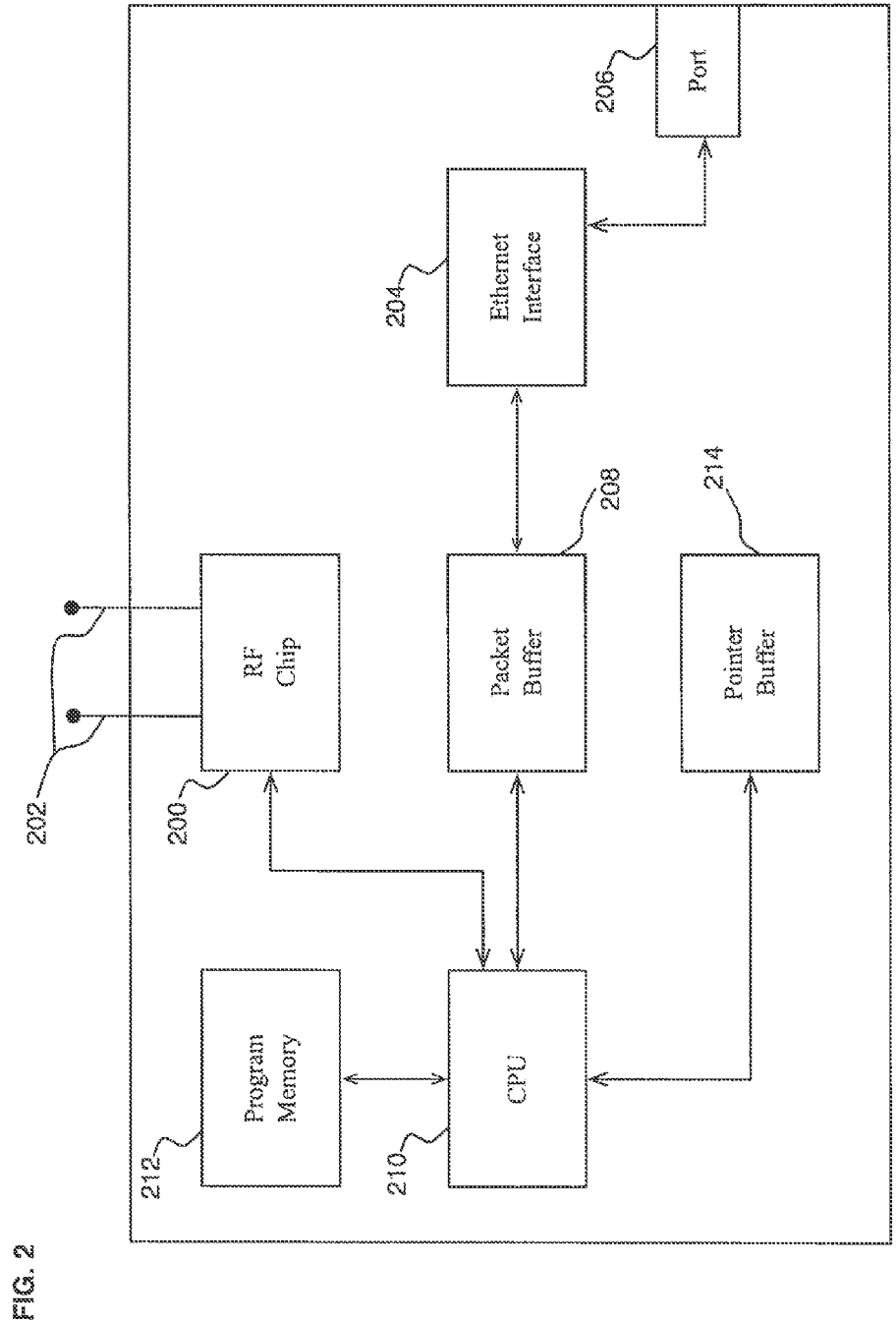
FIG. 2 is a schematic diagram of a video bridge operating in the network of FIG. 1.

FIG. 2 is a block diagram of a video bridge 106 or 108. The video bridge 106 or 108 includes a RF chip 200 and an Ethernet interface 204 through which the video bridge 106 or 108 connects to the network 100. The RF chip 200 is coupled to an antenna 202. The Ethernet interface 204 is coupled to an Ethernet port 206 into which an Ethernet cable may be connected. Data packets received by the RF chip 200 or the Ethernet interface 204 are stored in a packet buffer memory 208. The video bridge 106 or 108 also includes a central processing unit (CPU) 210 that executes code stored in a program memory 212 to control the operation of the video bridge 106 or 108. The CPU 210 monitors packets received by the RF chip 200 or the Ethernet interface 204, directs such packets to be stored in the packet buffer memory 208, and maintains pointers to such packets in a pointer buffer memory 214 as described hereinafter. The CPU 210 also selects when a particular packet in the packet buffer memory 208 should be transmitted using the RF chip 200 or the Ethernet interface 204.

Typically, the video bridge 106 or 108 accumulates a predetermined number of packets in the packet buffer memory 208 before releasing any packets to one of the devices 110 or 112, respectively, connected thereto.

In some embodiments, the video bridge 106 that is coupled to the gateway 102 adds a timestamp to each packet such video bridge receives from the gateway 102. In one embodiment, the video bridge 106 adds the timestamp only to a packet if such packet does not have a destination address associated with the client device 110 coupled to such video bridge 106. In one embodiment, the timestamp indicates when the video bridge 106 received such packet. In other embodiments, the time stamp indicates when the video bridge 106 retransmitted such packet. In some embodiments, the video bridge 106 appends the timestamp to the end of the packet.

Further, in some embodiments, the video bridge 106 or 108 removes the timestamp from a packet before such packet is released to the client device 110 or 112, associated therewith, respectively. As is described below, the video bridge 106 or 108 releases or transmits packets to the client device 110 or 112 associated therewith, respectively, in accordance with such timestamp. That is, a packet with an older timestamp is released before another packet with a newer timestamp.

The client device 110 or 112 receives packets from the video bridge 106 or 108, respectively, in accordance with the time when each packet was received by the gateway 102 or retransmitted by the video bridge 106 or 108. The sorting of packets in accordance with time of receipt or retransmit is undertaken by the video bridge 106 or 108 in a manner that is transparent to the client device 110 or 112 that receives such packets.

Figure 3:
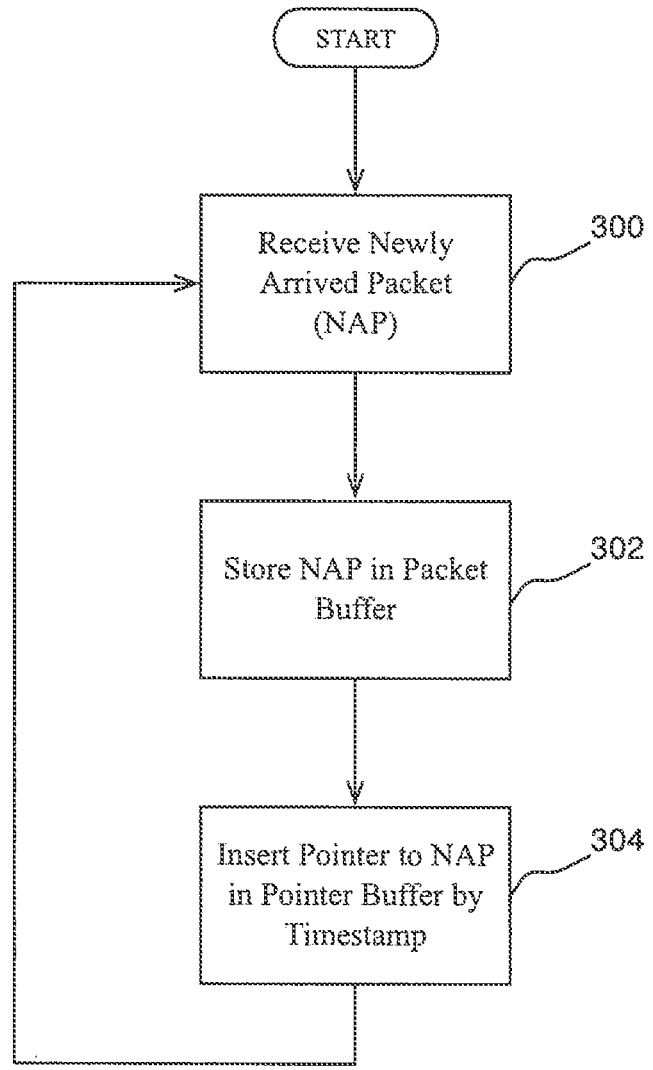
FIGS. 3-4 are flowcharts of instructions that may be stored in a program memory of the video bridge of FIG. 2.

The program memory 212 includes a set of instructions that when executed by the CPU 210 cause the CPU 210 to process new packets as such packets are received. FIG. 3 shows a flowchart of such instructions stored in the program memory 212 of one embodiment of the video bridge 106 or 108. A block 300 receives the newly arrived packet (NAP) and a block 302 stores the NAP in the packet buffer memory 208. A block 304 inserts a pointer in the pointer buffer memory 214 that identifies the location in the packet buffer memory 208 where the NAP is stored. The pointers in the pointer buffer memory 214 are sorted in accordance with the time when the packet associated with each such pointer was transmitted. In some embodiments, the pointer buffer memory 214 is organized as a data array of pointers. In other embodiments, the pointer buffer memory 214 may be organized as a linked list, a binary tree, or other such data structure. In some embodiments, the pointers in the pointer buffer memory 214 are sorted each time a NAP is received.

Figure 4:
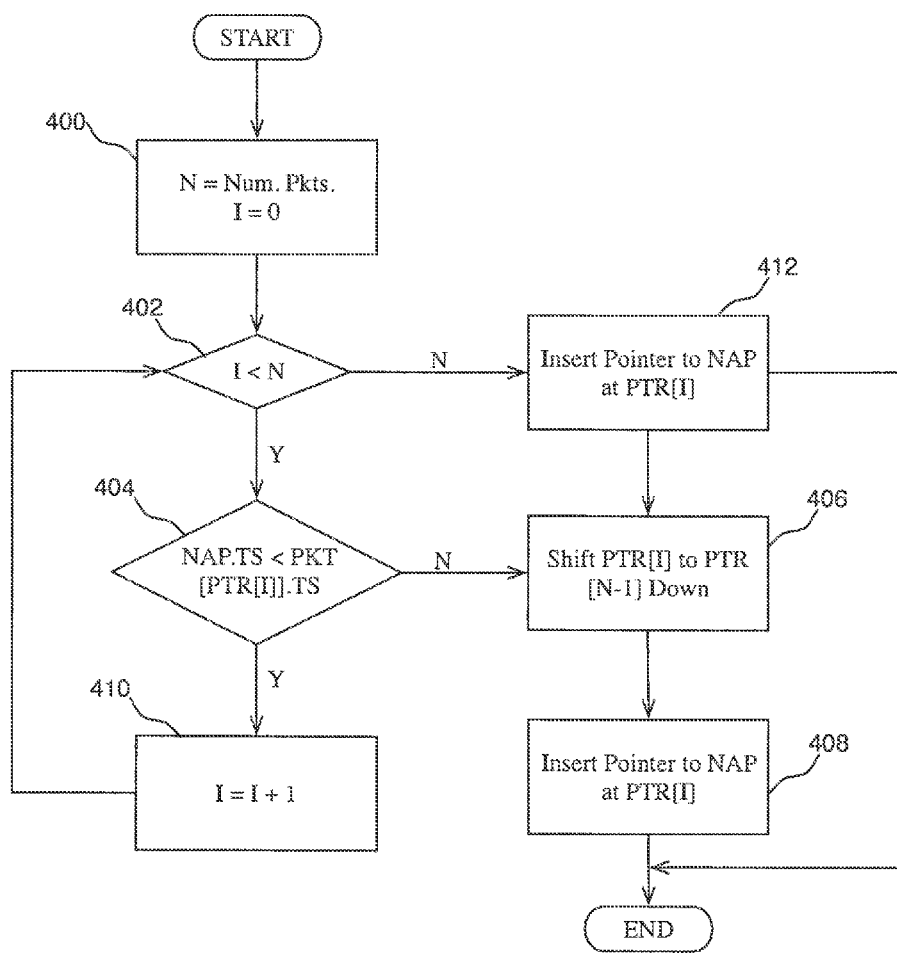

FIG. 4 is a flowchart of the instructions stored in the program memory 212 that when executed cause the CPU 210 to insert the pointer to the NAP into a pointer buffer memory 214 in accordance with the block 304. In particular, FIG. 4 is an example of instructions if the pointer buffer memory 214 is organized as an array and an insertion sort algorithm is used to maintain such array in sorted order. A block 400 initializes a value N to be the number of pointers in such array and a value I to zero. A block 402 determines if the value I is less than the value N and, if so, proceeds to a block 404. The block 404 determines if the value in the field 420 in the NAP representing the time of transmission thereof is less than the value in such field 420 of the packet associated with the pointer at index I of the pointer buffer memory 214. That is, the block 404 determines if the NAP was transmitted before the packet identified by the pointer stored at the index I of the pointer buffer memory 214. If so, a block 406 shifts the pointers stored in the pointer buffer memory 214 at indices I through N−1 thereof downward by one. In particular, the pointer at index N−1 of the pointer buffer memory 214 is copied into the index N of the pointer buffer memory 214, and the pointer at index N−2 of the pointer buffer memory 214 is copied into the index N−1 of the pointer buffer memory 214, and so on. Thereafter, a block 408 stores at the index I of the pointer buffer memory 214 a pointer that identifies the location in the packet buffer memory 208 where the NAP is stored.

If the block 404 determines that the NAP was transmitted after the packet identified by the pointer stored at the index I of the pointer buffer memory 214, a block 410 increments the value I by one and returns to the block 402. If the block 402 determines the value I is not less than the value N, that is the value I is identical to the value N, a block 412 inserts at the index I of the pointer buffer memory 214 a pointer that identifies the location of the packet buffer memory 208 where the NAP is stored.

Figure 5:
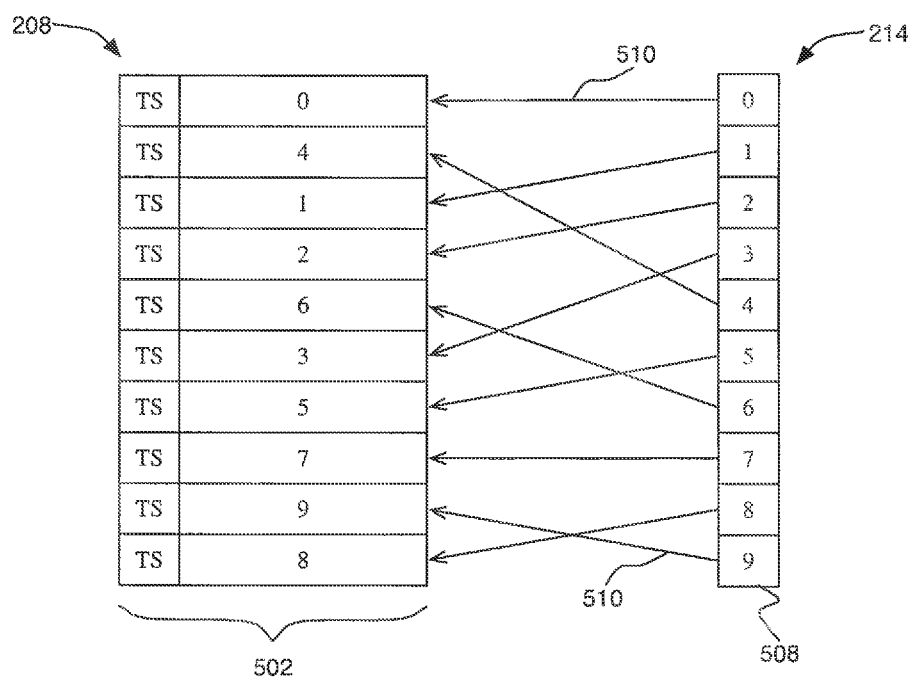
FIG. 5 is an illustration of exemplary packet buffer and pointer buffer memories of the video bridge of FIG. 2.

FIG. 5 illustrates an exemplary packet buffer memory 208 and a corresponding pointer buffer memory 214 that includes pointers that identify the locations of packets stored in the packet buffer memory 208. Elements of a column 502 illustrates the packets in the packet buffer 208. Each packet includes a timestamp value that indicates the time when such packet was transmitted, for example, by the gateway 102 or the video bridge 106. It should be apparent that the order of receipt is not identical to the order of transmission.

Elements of a column 508 indicates the values of the indices of the pointer buffer memory 214 and the arrows 510 indicate the pointers that identify the locations in the packet buffer memory 208 where packets are stored. As described above, the entries in the pointer buffer memory 214 allow the packets stored in the packet buffer memory 208 to be accessed in accordance with the time when such packets were transmitted.

Figure 6:
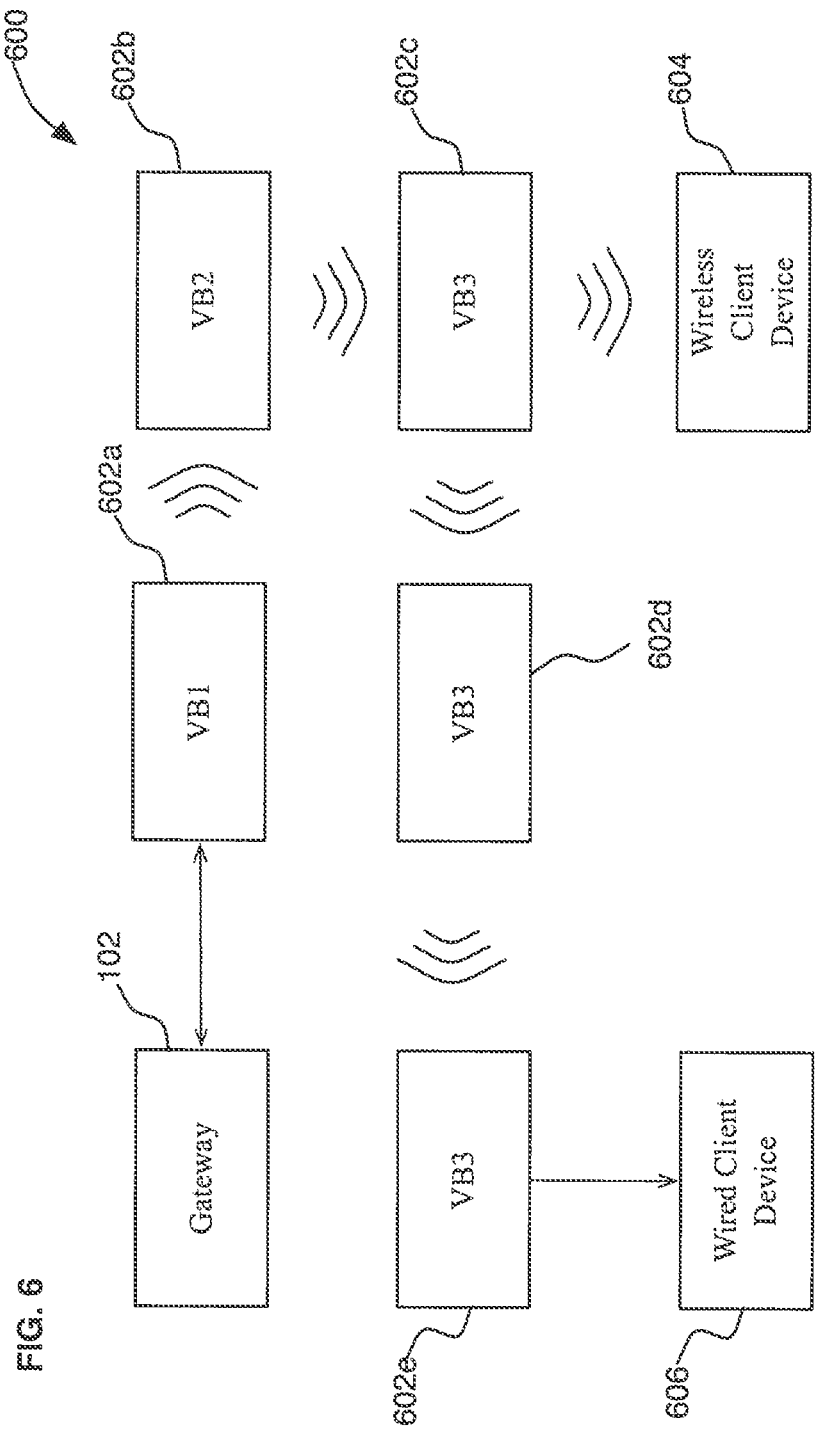
FIG. 6 is a block diagram of another network.

Packets transmitted between video bridges may involve one or more intermediate video bridges. FIG. 6 is a block diagram of an exemplary network 600 that includes a gateway 102 and video bridges 602a through 602e. The network 600 also includes wireless client device 604 associated with the video bridge 602c and a wired client device 606. In the network 600, the video bridges 602a and 602b retransmit to the network 600 all packets received thereby. The video bridge 602c determines if a packet received thereby is addressed to the wireless client device 604 and, if so, transmits such packet to the wireless client device 604. Otherwise, the video bridge 602c retransmits the packet to the network 600. For example, if the video bridge 602c receives a packet addressed for the wired client device 606, the video bridge 602c retransmits such packet. The video bridge 602d receives the retransmitted packet and again retransmits to the network 600. The video bridge 602e receives the packet retransmitted by the video bridge 602d and transmits such packet to the wired client device 606. Typically, intermediate video bridges are used to extend the distance between the video bridge 602a connected to the gateway 102 and wireless and wired client devices 604 and 606, respectively.

In some cases, the video bridge 106 or 108 may receive a packet that has a destination address that is not associated with a device 110 or 112, respectively, connected thereto. In such cases, the video bridge 106 or 108 temporarily stores the packet in the packet buffer memory 208 thereof but does not store in the pointer buffer memory 214 a pointer to such packet. The video bridge 106 or 112 thereafter retransmits the packet to the network 100. For example, if the video bridge 106 receives a packet that has a destination address associated with the client device 114, such video bridge 106 temporarily stores the packet and retransmits such packet immediately.

Figure 7:
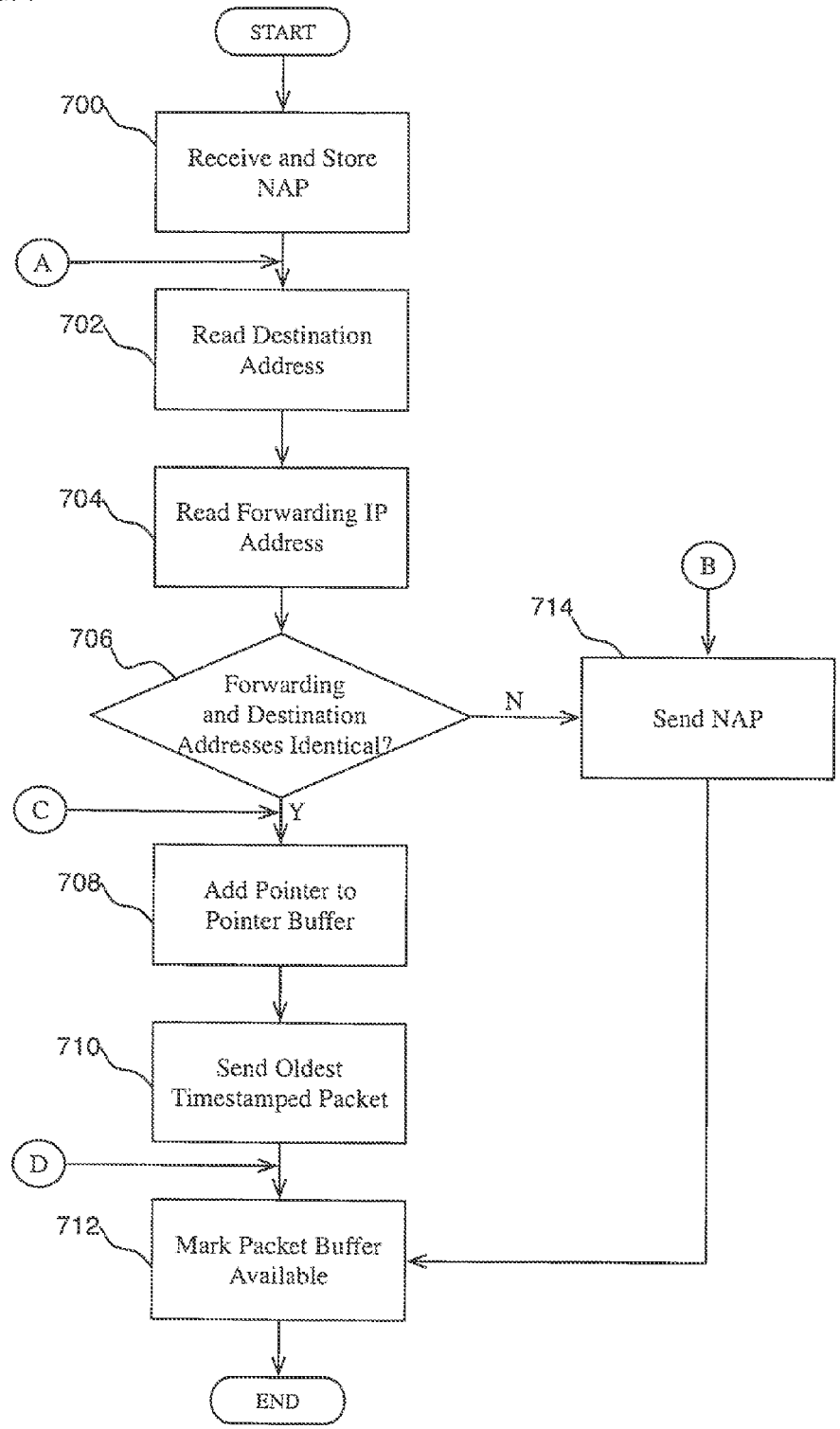
FIGS. 7-9 are further flowcharts of instructions that may be stored in the program memory of the video bridge of FIG. 2.

FIG. 7 is a flowchart of instructions stored in the program memory 212 that when executed cause the CPU 210 to retransmit a packet as described above. A block 700 receives and stores a newly arrived packet (NAP) into the packet buffer memory 208 as described above in connection with the blocks 300 and 302. A block 702 reads the value of the destination address from the field 408 of the NAP. A block 704 reads the forwarding IP address of the device 110 or 112 connected to the video bridge 106 or 108, respectively. The forwarding IP address is the IP address of the client device 110 or 112 associated with the video bridge 106 or 108, respectively, that has received the NAP. A block 706 compares the destination and forwarding IP addresses and if the two IP addresses are identical proceeds to a block 708.

The block 708 adds a pointer to the pointer buffer memory 214 as described hereinabove with respect to block 304 of FIG. 3. Thereafter, a block 710 sends the packet in the packet buffer memory 208 that has the oldest timestamp to the device associated with the forwarding IP address read at the block 704. The block 710 selects the packet with the oldest timestamp by selecting the packet identified by pointer at index 0 of the pointer buffer memory 214. Further, if the forwarding IP address is associated with a device connected to the video bridge that received the NAP by an Ethernet connection, then the block 710 copies the packet with oldest timestamp to the Ethernet interface 204. Otherwise the block 710 copies the packet with the oldest timestamp to the RF chip 200. In a preferred embodiment, the block 710 copies the packet with the oldest time stamp to the Ethernet interface 204 or the RF chip 200 using direct memory access. However, it should be apparent that other methods of copying such packet may be used. In one embodiment, the block 710 marks the entry in the pointer buffer memory 214 associated with the copied packet as invalid. When identifying a packet with the oldest timestamp, the block 710 ignores any entries in the pointer buffer memory 214 that are marked invalid. In some embodiments, invalid entries in the pointer buffer memory 214 are removed each time a new reference is added to such memory 214, for example, by the block 304.

After the block 710 copies the packet with the oldest timestamp, a block 712 marks the location in the packet buffer memory 208 where such packet was stored as available.

Returning to block 706, if such block determines that the destination and forwarding IP addresses are not identical, a block 714 copies the NAP to the RF chip 200 for retransmission. Thereafter, the block 712 marks the location of the packet buffer memory 208 where the NAP was stored as available.

Figure 8:
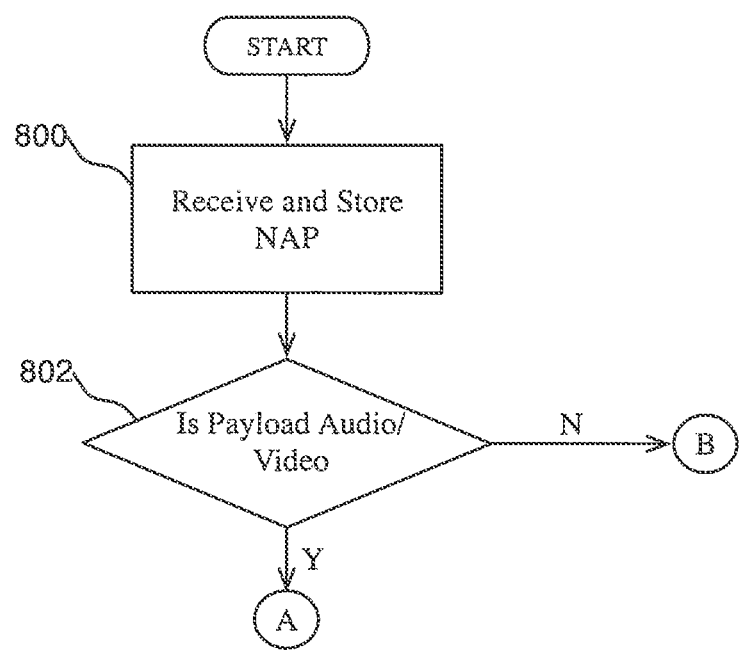

In some embodiments, the video bridge 106 or 108 may buffer only those packets that include a payload that is sensitive to transmission delay jitter such as, for example, payloads associated with video or audio. FIG. 8 shows a flowchart of processing undertaken by a processor 210 of such an embodiment. In particular, a block 800 receives and stores a NAP as described above. A block 802 checks data in the received packet to determine the protocol associated with such data and if the protocol is associated with video or audio processing proceeds to the block 702 of FIG. 7. Otherwise, processing proceeds to the 714 of FIG. 7 that retransmits the NAP.

Figure 9:
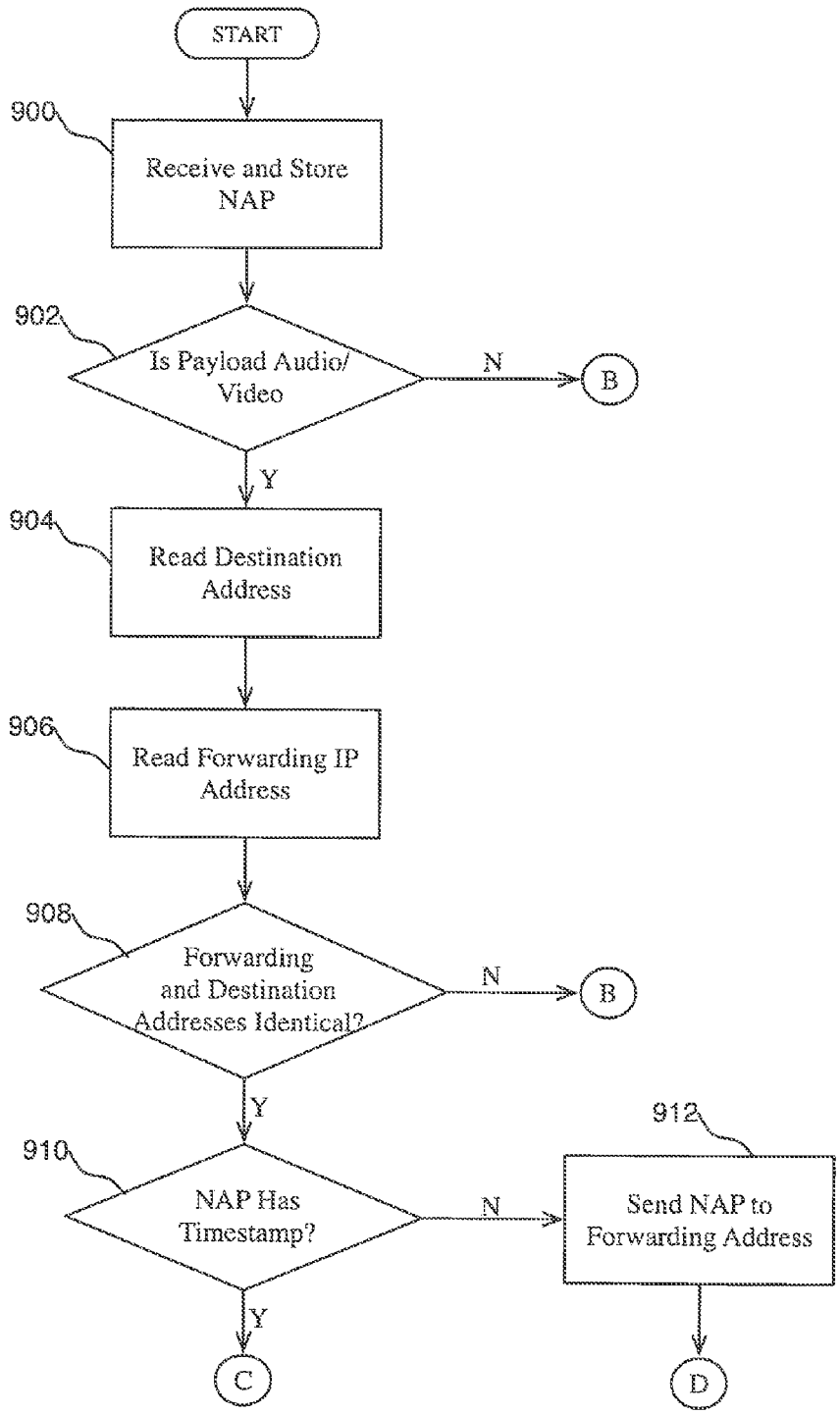

In some cases, a video bridge 106 or 108 may receive a packet that includes data that may be sensitive to transmission delay jitter but that does not include appropriate timestamp information that allows such packet to be buffered as described above. FIG. 9 is a flowchart of instructions that are executed by the processor 210 of a video bridge 106 or 108 such a packet is received. A block 900 receives and stores the NAP. A block 902 determines if the NAP includes a payload that is sensitive to transmission delay jitter and if not proceeds to the block 714 of FIG. 7. Otherwise, a block 904 determines the destination IP address specified in the NAP. A block 906 reads the forwarding IP address of the device associated with the video bridge 106 or 108 that received the NAP. A block 908 compares the destination and forwarding IP addresses and if such addresses are not identical proceeds to the block 714 of FIG. 7. Otherwise, a block 910 determines if the NAP includes a valid timestamp and, if so, proceeds to the block 708 of FIG. 7. If the NAP does not include a valid timestamp, a block 912 transmits the NAP to the device associated with the forwarding IP address by copying such packet to the Ethernet interface 204 or the RP chip 200 as described above. Thereafter, processing proceeds to the block 712 of FIG. 7.

Figure 10A:
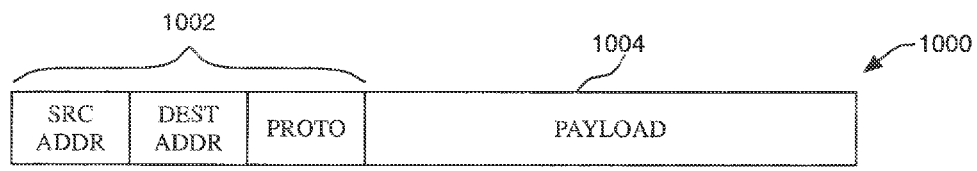
FIGS. 10A, 10B, 10C, and 10D are illustrations of a packet that may be received by the video bridge of FIG. 2.

FIG. 10A shows a format of the contents of a typical packet 1000, for example, an Ethernet or IP packet that may be transmitted over a network. The packet 1000 includes a header portion 1002 and a payload portion 1004. The header portion 1002 includes the address 1006 of the transmitting device, for example, the video source 116, and the address 1008 of the receiving device, for example, one of the devices 110 or 112. The header also includes protocol information 1010 that identifies the type of data encoded in the payload 1004.

Figure 10B:
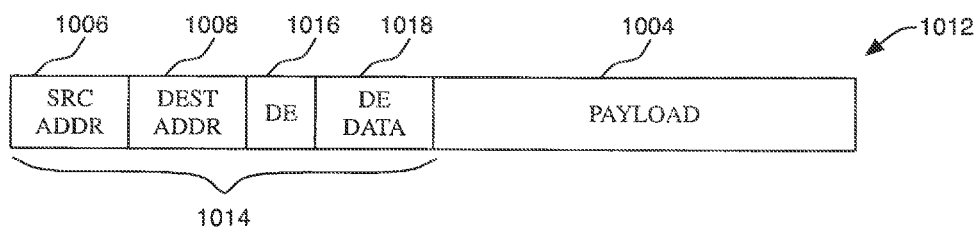

When the packet 1000 is presented to a transmitter for delivery to a receiver that equalizes the transmission delay, the transmitter uses the data in the packet 1000 to develop an encapsulated packet 1012 that has a layout shown in FIG. 10B. The packet 1012 also has a header portion 1014 that includes the address 1006 of the transmitting device and the address 1008 of the receiving device. The header portion 1014 includes a further protocol field 1016 that identifies the encapsulated packet 1012 as a transmission delay equalization packet. In addition, the encapsulated packet includes delay equalization data 1018 that may be used by the receiver and the payload 1004.

Figure 10C:
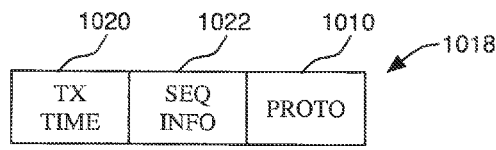

FIG. 10C shows an exemplary layout of the delay equalization data 1018 in the encapsulated packet 1012. In particular, the delay equalization data 1018 includes a field 1020 with a value of a timestamp that represents when the packet 1012 was transmitted, a sequence information field 1022 that identifies an ordinal position of the packet 1012 in a sequence of packets that are to be transmitted, and the protocol information 1010 from the packet 1000. In some embodiments, the delay equalization data 1018 includes only the timestamp. Further, the delay equalization data may be provided by the video source 116 when the packet is transmitted by the gateway 104 and/or any video bridge 106, 108, or 602 through which such packet is transmitted.

Figure 10D:
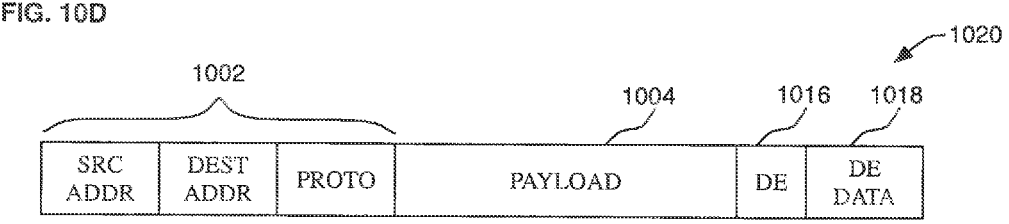

FIG. 10D shown a layout of another embodiment of an encapsulated packet 1020 that may be developed by the transmitter. To create the packet 1020, the transmitter appends to the packet 1000 the additional protocol field 1016 that identifies the packet 1020 as a data encapsulation packet and the data equalization data 1018. A transmitter may be able to create the encapsulated packet 1020 more efficiently than the packet 1012 since such creation of such packet may not require copying or moving the elements of the packet 1000. The additional protocol field 1016 and the data equalization 1018 may be discarded or ignored by devices that do not support data equalization (or delay jitter reduction).

Figure 11:
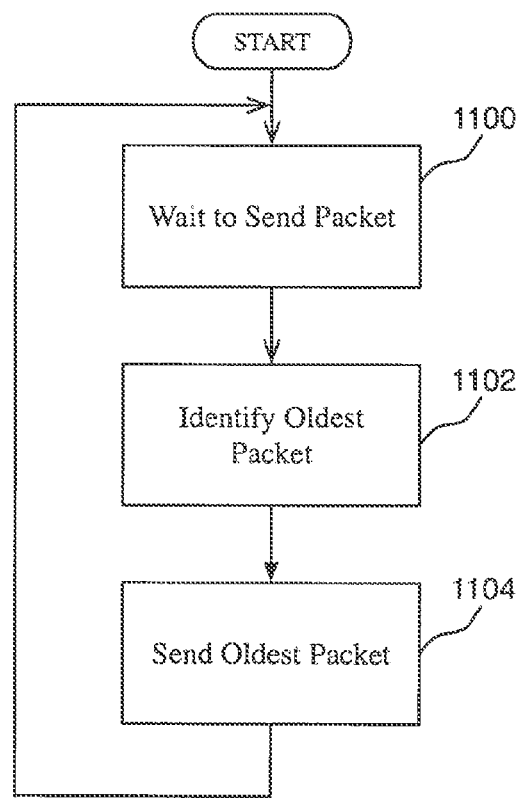
FIG. 11 is a flowchart of instructions that may be stored in a device operating in the network of FIG. 1.

FIG. 11 is a flowchart of a instructions stored in the program memory 212 that when executed by the processor 210 cause an embodiment of the video bridge 106 or 108 to send a packet. A block 1100 waits a predetermined amount of time. A block 1102 uses the pointers in the pointer buffer memory 214 to identify the packet in the packet buffer memory 208 that has the oldest transmission timestamp. A block 1104 copies the identified packet from the packet buffer memory 208 to the RF chip 200 or Ethernet interface 204 depending on whether the client device that is to receive the packet is connected to the video bridge via a wireless or a wired connection, respectively. After the block 1104, processing returns to the block 1100 to wait for the predetermined amount of time. It should be apparent that an interrupt-based timer may be used to actuate the block 1100 when a particular amount of time has elapsed. Further, the processor 210 may send packets in accordance with the block 710 of FIG. 7 and FIG. 11. In such cases, the processing of FIG. 11 may be undertaken if the predetermined amount of time elapses after a packet has been sent. For example, the block 710 may reset a timer used to actuate the block 1100 of FIG. 11 after the block 710 sends a packet.

In some embodiments, if the packet buffer memory 208 of the video bridge 106 or 108 becomes full, the video bridge 106 or 108 may stop accepting additional packets until memory becomes available. In such cases, the packet acknowledgement features of the communications protocol being used will cause the video source 116 to resend the packets not accepted by the video bridge 106 or 108. In other embodiments, the video bridge 106 or 108 may send flow control messages, for example, as defined by the IEEE 802.3x standard to reduce incoming traffic rates. Such flow control messages are transmitted from the video bridge 106 or 108 via the gateway to the video source 116.

In some embodiments, the video bridge 106 may interrogate data sent in a packet received thereby. In such embodiments, if the data, for example MPEG data, include timestamp or sequencing information then the video bridge 106 does not add an additional timestamp to the packet as described above. Instead, instructions stored in the program memory 312 cause the CPU 210 to sort the pointer buffer memory 214 in accordance with the timestamp or sequence information included in the packet data, for example, at the block 304 of FIG. 3. That is, the video bridge 106 or 108 uses timestamp or sequencing information in the data sent in the packet to determine the order in which packets are released to the client device 110 or 112 associated therewith, respectively.

The embodiments described herein above can also be used to reduce transmission delay jitter that is introduced between the video source 116 and the gateway 104, and/or that is introduced between the gateway 104 and the video bridge 106, and/or that is introduced between the video bridges 106 and 108.

In some embodiments, the video bridge 106 or 108 may include routing and/or switching capabilities. In other embodiments, the video bridge 106 or 108 does not include such capabilities. Such a video bridge 106 or 108 may only transmit packets to the device 110 or 112 associated therewith, respectively, or retransmit packets to the network. The memory and CPU 210 requirements may be sufficiently simple that such a video bridge 106 or 108 may be manufactured relatively inexpensively and marketed accordingly.

In a preferred embodiment, the processing undertaken by the video bridges 106 and 108 operates on packets that comply with protocols associated with the data link layer of the Open Systems Interconnection (OSI) model specified by the International Organization for Standardization. However, it should be apparent such processing may operate on packets that are associated with other layers of the OSI model.

Other embodiments of the invention including all the possible different and various combinations of the individual features of each of the foregoing described embodiments are specifically included herein.

In some embodiments, the video bridge 106 or 102 communicates using a preselected or a channel selected by another device, for example, the gateway 102, operating in the network. In such embodiments, instructions stored in the program memory 212 cause the RF chip 200 to tune to frequencies associated with such channel and thereby receive and transmit packets using such frequencies.

Some embodiments of the video bridge 106 or 112 transmit packets to other devices in the network 100 using a first channel and concurrently monitor other channels to develop an estimate of the channel capacity for each such channel. For example, the channel capacity estimate of a channel may be developed using measurements of a SNR, channel available check (CAC) and/or clear channel assessments (CCA) associated with such channel. Further, in addition to developing an estimate of the channel capacity for each of the other channels, some embodiments of the video bridge 106 or 112 use the CCA measurement of a channel to develop a confidence level that indicates the probability that frequencies associated with the channel are not used by radar systems.

In some cases the video bridge 106 or 112 provides such channel capacity estimates and confidence level information to the gateway 102. The gateway 102 evaluates the channel capacity estimates provided thereto to direct the devices operating in the network 100 to switch to a second channel, wherein the channel capacity of the second channel is estimated to be greater than that of the first channel. In some embodiments, the gateway 102 only switches to a second channel that has a confidence associated level associated therewith that indicates that a radar system is not using the frequencies associated with such second channel. In other cases, if the video bridge 106 or 112 identifies a second channel that has a channel capacity that is estimated to be greater than that of the first channel, video bridge 106 or 112 may direct the devices in the network 100 to switch to the second channel. In some embodiments, the video bridge 106 or 112 switches to such second channel only if the confidence level associated therewith indicates that the frequencies for the second channel are not being used by a radar system.

Soyak et al., U.S. Provisional Patent Application No. 61/591,607, which is co-pending discloses a system and method for developing the channel capacity estimates and confidence levels described above and selecting channels in accordance therewith. The entire contents of Soyak et al. are incorporated herein by reference.

In some embodiments, the program memory 212 includes a set of instructions stored therein when executed by the CPU 210 cause the video bridge 106 or 112 to monitor other channels as described above to develop the channel capacity estimates and/or confidence levels described above. The program memory 212 may also include a set of instructions stored therein that when executed by the CPU 210 cause the video bridge 106 or 112 to provide the channel capacity estimates and/or confidence levels to the gateway 102 or to switch the network 100 to use another channel for communications.

In some embodiments, the video bridge 106 or 112 may generate or receive on or management packets to automate the configuration of the video bridge 106 or 112 or other devices in the network 100. Birlik et al., European Patent Publication No, EP 2,383,935 discloses a system for configuring devices in a wireless network. The entire contents of Birlik et al. are incorporated herein by reference.

For example, the gateway 102 and the video bridge 106 or 112 may each include a button (not shown) that begins the configuration process. When such buttons are pressed within a predetermined time period on the gateway 102 and the video bridge 106 or 112, management packets are exchanged between the gateway 102 and the video bridge 106 or 112 to establish a network link therebetween.

To establish the network link, instructions stored in the program memory 212, when executed, determine if the video bridge 106 or 112 is mesh capable and if so cause a "Mesh Link Create Flag" and a value of a MAC address associated with the video bridge 106 or 112 to be added to a WPS Vendor Specific Information element of a management packet. In addition, such instructions, when executed, cause a value of a "Network UUID," and a value of a configuration sequence number to be added to the WPS Vendor Specific information Element of the management packet. If a value of a "WPS PIN" is defined for the video bridge 106 or 112, such program instruction cause such value to be added to the WPS Vendor Specific Information element of the management packet. The program instructions thereafter cause WPS operations to be undertaken using the management packet that includes the foregoing information. Thereafter, the program instructions store the network configuration in a memory (not shown) of the video bridge 106 or 112.

If the network 100 is established as described above, any device operating in such network may modify network parameters and have such network parameters distributed to other devices. Some embodiments of the video bridge 106 or 112 include instructions stored in the program memory 212 that cause such video bridge to distribute modified parameters to other devices operating in the network 100. In particular, such instructions when executed cause the value of the configuration sequence number to be incremented and a new beacon packet to be generated. The new beacon packet includes the modified parameters and the increased configuration sequence number.

If the video bridge 106 or 112 receives a beacon packet generated as described above, instructions stored in the program memory 212, when executed, cause the received beacon packet to be analyzed to determine if a WPS Vendor Specific Information element exists therein. If such element exists, the instructions, when executed, cause a vendor ID of a device that transmitted the beacon packet in such element to be compared to a vendor ID of the video bridge 106 or 112. If the vendor IDs match, the Network UM of the device that transmitted the beacon packet is compared to the Network HUM of the video bridge 106 or 112. If the Network UUIDs match, the instructions cause the value of a configuration sequence number in the received beacon packet to be compared to the configuration sequence number stored in the memory of the video bridge 106 or 112. If the value of the configuration sequence number in the received beacon packet is greater than the value of the stored configuration sequence number, the instructions stored in the program memory 212 cause WPS PIN operations to be initiated.

The configuration process described above reduces the time and technical skill required to setup and configure a device operating in a wireless network. Further, such configuration process automates otherwise manual modification of network parameters.

In addition to receiving, sorting, and transmitting packets as described above, instructions may be stored in the program memory 212 of the processor 210, that when executed cause one or more of the following to be undertaken:

a multicast or broadcast packet to be recognized and converted into a unicast packet addressed to a particular device operating in the network 100;

a predetermined number of packets for a client device 110 or 112 to be held or buffered in the packet buffer memory 208 before any of such packets is released to the client device 110 or 112;

a timestamp to be added to a packet if none is present;

a timestamp to be removed from a packet before such packet is provided to a client device 110 or 112;

a payload in a packet to be determine to be sensitive to transmission delay jitter;

the packet buffer memory 208 be determined to be full and, optionally, a flow control message generated and transmitted;

a timestamp or sequence number in a payload of a packet to be identified and a pointer to the pointer buffer memory 214 with such packet added in accordance with such timestamp or sequence number;

channel capacity of a channel being used for communication and/or channel capacity of a channel not being used for communication to be estimated;

a confidence level to be determined, wherein such confidence level is associated with a probability that a frequency associated with a channel is used by a radar system and/or a probability that a frequency associated with a channel not being used for communication is used by a radar system;

a channel capacity of channel provided to another device operating in the network 100;

an estimate of the probability that a frequency associated with a channel is used by a radar system provided to another device operating in the network;

communications from a first channel to be switched a second channel; and automatic configuration of the network parameters associated with the network in which the video bridge is operating.

An exemplary network device in accordance with the present disclosure comprises an antenna connected to an RE chip, a processor operatively coupled to an Ethernet port, an RF chip, a program memory, a packet buffer memory, a pointer buffer memory, and a program memory. The program memory contains a first set of instructions that, when executed by the processor, cause a plurality of packets that are received by the antenna and the RF chip in a first order to be stored in the packet buffer memory in that first order. The program memory also contains a second set of instructions that, when executed by the processor, cause a pointer associated with each one of the plurality of packets to be stored in the pointer buffer memory and a third set of instructions that, when executed by the processor, cause the pointers stored in the pointer buffer memory to be placed in a second order with a timestamp that is included with each packet that is not recognizable at a player level. The program memory contains a fourth set of instructions that, when executed by the processor, cause the packets stored in the packet buffer memory to be removed therefrom and passed along to the Ethernet port in accordance with the sorted pointer to each packet stored in the pointer buffer memory.

In one embodiment, the timestamp of each packet received by the exemplary network device can be at the end of such packet and, optionally, the timestamp is included in the packet at the time it is received by such network device.

The exemplary network device can comprise a video bridge.

The packet received by the exemplary network device can include a destination address and the network device does not modify such destination address.

The fourth set of instructions of the exemplary network device, when executed by the processor, can cause the packet from the packet buffer memory to be passed along in response to receipt of a further packet.

The packets received by the network device described in paragraph [0091] can include a payload that is associated with at least one of video or audio data.

The exemplary network device can be associated with a client device and the second set of instructions that, when executed, cause only pointers to packets in the packet buffer memory that are associated with the client device to be stored in the pointer buffer memory.

The exemplary network device can be associated with a client device that includes a video player.

The exemplary network device can receive the plurality of packets from the Internet.

The exemplary network device can be operated in a local area network and include the first set of instruction that, when executed, can also cause packets to be received from another device operating in such network.

The exemplary can include a further set of instruction that, when executed by the processor, can cause a channel capacity of a channel used for communication and/or channel capacity of a channel not being used for communication to be estimated.

The exemplary network device can include a further set of instructions that, when executed by the processor, cause a confidence level to be determined, wherein such confidence level is associated with a probability that a frequency associated with a channel is used by a radar system and/or a probability that a frequency associated with a channel not being used for communication is used by a radar system.

The exemplary network device can include a further set of instructions that, when executed by the processor, cause automatic configuration of the network parameters associated with the network in which the video bridge is operating.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications that come within the scope of the invention are reserved.

I claim:

1. A network device, comprising:
   an input port;
   a processor operatively coupled to an output port, a program memory, a packet buffer memory, a pointer buffer memory, and a program memory;
   wherein the program memory contains a first set of instructions that, when executed by the processor, cause a plurality of packets that are received by the input port in a first order to be stored in the packet buffer memory in that first order;
   wherein the program memory contains a second set of instructions that, when executed by the processor, cause a pointer associated with each one of the plurality of packets to be stored in the pointer buffer memory;
   wherein the program memory contains a third set of instructions that, when executed by the processor, cause the pointers stored in the pointer buffer memory to be placed in a second order with a timestamp that is included with each packet that is not recognizable at a player level; and
   wherein the program memory contains a fourth set of instructions that, when executed by the processor, cause the packets stored in the packet buffer memory to be removed therefrom and passed along to the output port in accordance with the sorted pointer to each packet stored in the pointer buffer memory.

2. The network device of claim 1, wherein the timestamp is at the end of each packet.

3. The network device of claim 1, wherein the timestamp is included in the packet at the time it is received by the network device.

4. The network device of claim 1, wherein the network device comprises a video bridge.

5. The network device of claim 1, wherein the packet includes a destination address and the network device does not modify such destination address.

6. The network device of claim 1, wherein the fourth set of instructions that, when executed, cause the packet from the packet buffer memory to be passed along in response to receipt of a further packet.

7. The network device of claim 1, wherein the packets include a payload that is associated with at least one of video or audio data.

8. The network device of claim 1, wherein the network device is associated with a client device and the second set of instructions that, when executed, cause only pointers to packets in the packet buffer memory that are associated with the client device to be stored in the pointer buffer memory.

9. The network device of claim 8, wherein the client device includes a video player.

10. The network device of claim 1, wherein the plurality of packets is received from the Internet.

11. The network device of claim 1, wherein the network device is operated in a local area network and the first set of instruction that, when executed, cause packets to be received from another device operating in such network.

12. The network device of claim 1, wherein the input port is an antenna.

13. The network device of claim 12, wherein the antenna is coupled to an RF chip.

14. The network device of claim 1, wherein the output port is an Ethernet port.

* * * * *